(No Model.)
M. GURNETT.
ADJUSTABLE TRACK GAGE.
No. 475,309. Patented May 24, 1892.
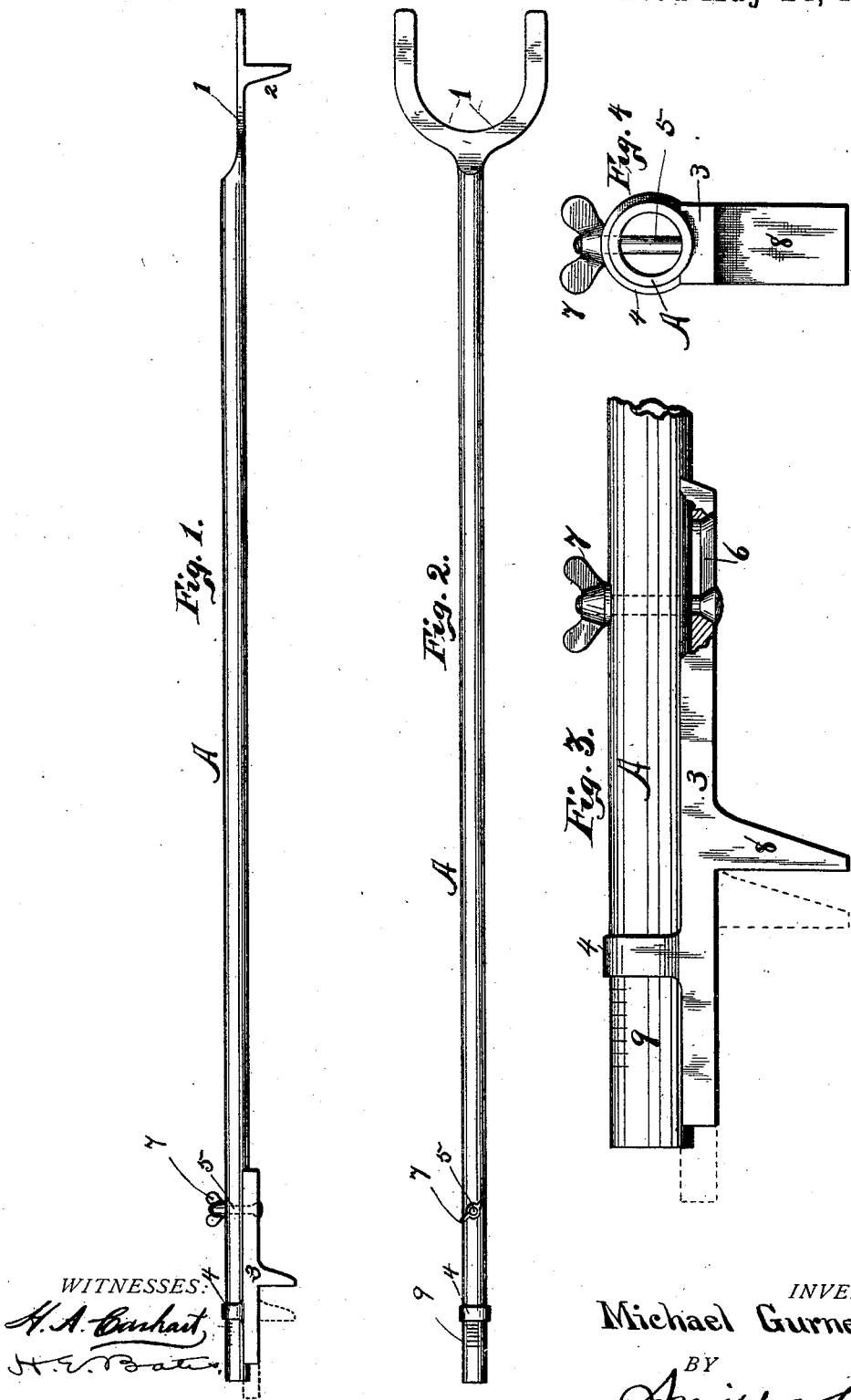
WITNESSES:
H. A. Carhart
H. E. Bates
INVENTOR,
Michael Gurnett,
BY
Smith & Denison
ATTORNEYS

UNITED STATES PATENT OFFICE.

MICHAEL GURNETT, OF BINGHAMTON, NEW YORK.

ADJUSTABLE TRACK-GAGE.

SPECIFICATION forming part of Letters Patent No. 475,309, dated May 24, 1892.

Application filed February 11, 1892. Serial No. 421,092. (No model.)

*To all whom it may concern:*

Be it known that I, MICHAEL GURNETT, of Binghamton, in the county of Broome, in the State of New York, have invented new and useful Improvements in Railroad-Track Gages, of which the following, taken in connection with the accompanying drawings, is a full, clear, and exact description.

My invention relates to gages, and particularly to railroad-gages, which are adapted for use in the laying of railroad-rails to actually determine the distance between them.

My object is to produce a gage which may be used not only in determining the distance between rails which are parallel to each other but adjustable to a graduating-scale, which will enable me to exactly measure and gage the distance between the rails upon a curve; and to that end my invention consists in providing the ordinary rail-track gage with an adjustable lug at the opposite end to the fork, which is adapted to vary the distance between the rails for the purpose of measuring curves, it having been found by practice that it is necessary to place the rails farther apart upon curves, and in the several other novel features of construction and operation hereinafter described, and which are specifically set forth in the claims hereunto annexed, reference being had to the accompanying drawings, in which—

Figure 1 is a side elevation of the gage complete, showing the gage extended in dotted lines. Fig. 2 is a top plan view thereof. Fig. 3 is an enlarged view of the adjustable end, a portion of the adjusting-piece being broken away to show the slotway. Fig. 4 is a front end view thereof.

It has been found by practice that it is necessary to place the rails farther apart upon curves. Thus in a curve measuring three to five degrees it is necessary to increase the distance between the rails one-eighth ($\frac{1}{8}$) of an inch, having reference to the standard gage, which is four feet eight and one-half inches wide. In curves of five to seven degrees an increase of one-quarter ($\frac{1}{4}$) inch, and so on in substantially the same ratio.

A is the body of an ordinary rail-track gage and preferably constructed tubular in form, and provided at one end with a fork 1, each prong having a downwardly-extending lug 2.

The opposite end of the body I provide with a plate 3, adapted to fit and travel upon the under side thereof and held adjustably in position by the strap or eye 4 and a bolt 5, passing through the body of the inner end of the plate 3. This inner end of the plate 3 is provided with longitudinal slotway 6, and the bolt has a thumb-nut 7 upon its upper side by which the plate may readily be loosened and adjusted to any length desired.

8 is a lug upon the lower side of the plate, which, together with the lugs 2 upon the prongs 1, determine the distance between the rails.

The outer end of the body A is marked off into inches and subdivisions thereof 9, which may readily be seen, and by which the gage is lengthened or diminished, so that the distance between the rails may be readily marked, and at the same time be at all times under the eye of the operator to be sure that it is correct, when from any cause the plate 3 becomes moved from the point at which it is set.

Having described my invention, what I claim is—

1. A railroad-track gage comprising a body having a fork at one end, a downwardly-extending lug thereon, a plate adapted to fit and travel the lower side of the opposite end of the body, having a lug upon its lower side and an eye upon its upper outer end, and a bolt passing through the body and engaging with a slotway upon the inner end of the plate, as set forth.

2. A railroad-track gage comprising a tubular body having a fork at one end, a downwardly-extending lug thereon, a plate adapted to fit and travel the lower side of the opposite end of the body and having a lug upon its lower side, an eye upon its upper outer end, a bolt passing through the body and provided with a thumb-nut upon its upper end, and its lower end provided with a head engaging with the elongated slotway in the inner end of the plate, as set forth.

In witness whereof I have hereunto set my hand this 3d day of February, 1892.

MICHAEL GURNETT.

In presence of—
B. S. CURRAN, Jr.,
ROBT. T. CURRAN.